(12) United States Patent
Wang

(10) Patent No.: US 10,652,306 B2
(45) Date of Patent: *May 12, 2020

(54) CLASSIFIED MEDIA QUALITY OF EXPERIENCE

(71) Applicant: Conversant Wireless Licensing S.a r.l., Luxembourg (LU)

(72) Inventor: Ye-Kui Wang, Tampere (FI)

(73) Assignee: Conversant Wireless Licensing S.a r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,126

(22) Filed: Jan. 28, 2019

(65) Prior Publication Data

US 2019/0327285 A1 Oct. 24, 2019

Related U.S. Application Data

(63) Continuation of application No. 15/475,578, filed on Mar. 31, 2017, now Pat. No. 10,225,312, which is a
(Continued)

(51) Int. Cl.
*H04L 29/06* (2006.01)
*H04N 21/643* (2011.01)
(Continued)

(52) U.S. Cl.
CPC .......... *H04L 65/80* (2013.01); *H04L 65/4076* (2013.01); *H04L 65/607* (2013.01);
(Continued)

(58) Field of Classification Search
None
See application file for complete search history.

(56) References Cited

U.S. PATENT DOCUMENTS 6,181,738 B1  1/2001  Chheda et al.
6,477,355 B1  11/2002  Grayson et al.
(Continued)

FOREIGN PATENT DOCUMENTS

JP  2001-285390 A  10/2001
JP  2003-348155 A  5/2003
(Continued)

OTHER PUBLICATIONS

"Objective Image and Video Quality Assessment", IBM Technical Disclosure Bulletin, Jan. 1, 2002, Issue 453, p. 120, 5 pgs.
(Continued)

*Primary Examiner* — Jeffrey R Swearingen
(74) *Attorney, Agent, or Firm* — Conversant Wireless Licensing

(57) ABSTRACT

A method for reporting a streaming quality is shown, wherein at least one continuous media stream is streamed to a client (601), and wherein the streaming is controlled by a protocol (109) that is operated between the client (601) and a server (600), the method including selecting at least one quality metric and a quality metrics class from a pre-defined set of at least two quality metrics classes, and reporting to the server (600) the quality of the streaming based on the at least one selected quality metric and the selected quality metrics class. The protocol (109) is preferably a Real-time Streaming Protocol (RTSP) in combination with a Session Description Protocol (SDP) in the context of the 3GPP Packet-Switched Streaming Service (PSS). Also shown is a computer program, a computer program product, a system, a client, a server and a protocol.

14 Claims, 5 Drawing Sheets

Related U.S. Application Data continuation of application No. 13/902,807, filed on May 25, 2013, now Pat. No. 9,641,587, which is a continuation of application No. 10/589,060, filed as application No. PCT/IB2004/000356 on Feb. 12, 2004, now Pat. No. 8,452,884.

(51) Int. Cl.
*H04N 21/442* (2011.01)
*H04N 21/647* (2011.01)

(52) U.S. Cl.
CPC ..... *H04L 65/608* (2013.01); *H04N 21/44209* (2013.01); *H04N 21/643* (2013.01); *H04N 21/647* (2013.01)

(56) References Cited

U.S. PATENT DOCUMENTS

| | | | |
|---|---|---|---|
| 6,643,496 | B1 | 11/2003 | Shimoyama et al. |
| 6,882,634 | B2 | 4/2005 | Bagchi et al. |
| 6,954,800 | B2 | 10/2005 | Mallory |
| 7,502,350 | B2 | 3/2009 | Sugita |
| 7,599,307 | B2 | 10/2009 | Sectin et al. |
| 7,738,390 | B2 | 6/2010 | Rey et al. |
| 8,452,884 | B2 | 5/2013 | Wang |
| 9,641,587 | B2 | 5/2017 | Wang |
| 2001/0025239 | A1 | 9/2001 | Hackenberg et al. |
| 2002/0041570 | A1 | 4/2002 | Ptasinski et al. |
| 2003/0221014 | A1 | 11/2003 | Kosiba et al. |
| 2004/0136327 | A1 | 7/2004 | Sitaraman et al. |
| 2004/0139088 | A1 | 7/2004 | Mandato et al. |
| 2005/0089043 | A1* | 4/2005 | Seckin ............... H04L 41/5006 709/203 |
| 2008/0215704 | A1* | 9/2008 | Curcio .............. H04L 29/06027 709/217 |
| 2017/0339208 | A1 | 11/2017 | Wang |

FOREIGN PATENT DOCUMENTS

| | | |
|---|---|---|
| JP | 2003-209537 A | 7/2003 |
| JP | 2003-259371 A | 9/2003 |
| JP | 2003-341822 A | 12/2003 |
| JP | 2004-528752 A | 9/2004 |
| WO | 00/18058 | 3/2000 |
| WO | 02/071640 | 9/2002 |
| WO | 02/071736 A2 | 9/2002 |
| WO | 2004/004310 A2 | 1/2004 |
| WO | 2005/022852 A1 | 3/2005 |

OTHER PUBLICATIONS

Wang et al., "The Error Concealment Feature in the H.26L Test Model", IEEE, published 2002, 4 pgs.

Gabin, M. Frederic, "Draft Rel-6 PSS Quality Metrics Permanent Document, http://www.3gpp.org, Version: 0.10", Nov. 24, 2003, 19 pgs.

M. Gabin, NEC Technologies, "Draft Rel-6 PPS Quality Metrics Permanent Document:, 3GPP TSG-SA4", Meeting #29, Tampere, Finland, Nov. 24-28, 2003, 10 pgs.

3GPP TS 26.246 V, 1.0.0 (Nov. 2003) "3rd Generation Partnership Project; Technical Specification Group Services and System Aspects; Transparent end-to-end packet-switched streaming service (PSS), 3GPP, SMIL Language Profile", Release 6, 16 pgs.

3GPP TS 22.223 V6.3.0 (Sep. 2003), "3rd Generation Partnership Project; Technical Specification Group Services and System Aspects; Transparent end-to-end packet-switched streaming service; Stage 1", Release 6, 14 pgs.

3GPP TS 26.234 V5.6.0 (Sep. 2003), "3rd Generation Partnership Project; Technical Specification Group Services and System Aspects; Transparent end-to-end packet-switched streaming services (PSS); Protocols and codecs", Release 5, 86 pgs.

3GPP TS 26.245 V0.1.46 (2003-04717), "3rd Generation Partnership Project; Technical Specification Group Services and System Aspects; Transparent end-to-end packet-swtiched streaming services (PSS); Timed text format", Release 6, 17 pgs.

Handley, M., et al., Network Working Group, Request for Comments; 2327, Category: Standards Track, "SDP: Session Description Protocol", Apr. 1998, 43 pgs.

3GPP TS 26.233 V5.0.0. (Mar. 2002), "3rd Generation Partnership Project; Technical Specification Group Services and System Aspects; Transparent end-to-end packet-switched streaming services (PSS); General Description", Release 5, 12 pgs.

GPP TS 26.244 V1.0.0 (Dec. 2003), "3rd Generation Partnership Project; Technical Specification Group Services and System Aspects; Transparent end-to-end packet-switched streaming service (PSS); 3GPP file format (3GP)", Release 6, 37 pgs.

Network Working Group, Request for Comments 2326, Category: Standards Track, H. Schulzrinne et al., "Real Time Streaming Protocol (RTSP)", Apr. 1998, 93 pgs.

Patent Abstract of Japan, Japanese Publication No. 2003-209437, Sony Corp., published Jul. 25, 2003, 1 pg.

English Abstract of Japanese Publication No. 2001-285390, Matsushita Electric Ind. Co. Ltd., published Oct. 12, 2001, 1 pg.

Patent Abstract of Japanese Publication No. 2003-259371, Toshiba Corp., published Sep. 12, 2003, 1 pg.

* cited by examiner

```
QoE-header = "QoE-Metrics" ";" "Off" / 1#(stream-url ";"
Metrics" ";" Sending-rate [";" Range]) CRLF
stream-url = "url" "=" rtsp_URL
Metrics = "metrics" "=" "{" 1#(1 *Text) "}"
Sending-rate = "rate" "=" 1 *DIGIT / "End"
Range = as defined in IETF RFC 2327
DIGIT = as defined in IETF RFC 2327
Rtsp_URL = as defined in IETF RFC 2327
```

Fig2a  Prior Art

```
Feedbackheader = "QoE-Feedback" ":"
1#(stream-url 1 * (parameters) [";" Range] CRLF)
stream-url = "url" "=" rtsp_URL
parameters = ";" Metrics "="
"{" SP / 1#(Value [SP Timetamp]) "}"
Metrics = *TEXT
Value = 1 *DIGIT ["." *DIGIT]
Timestamp = 1 *DIGIT
Range = as defined in IETF RFC 2327
DIGIT = as defined in IETF RFC 2327
Rtsp_URL = as defined in IETF RFC 2327
SP = as defined in IETF RFC 2327
```

Fig2b  Prior Art

QoE-header = "QoE-Metrics" ";" "Off" / 1#(stream-url ";"
Metrics" ";" Sending-rate [";" Metrics-class] [";" Range]) CRLF
stream-url = "url" "=" rtsp_URL
Metrics = "metrics" "=" "{" 1#(1*Text) "}"
Sending-rate = "rate" "=" 1*DIGIT / "End"
Metrics-class = "class" "=" "0"/"1"/"2"
Range = as defined in IETF RFC 2327
DIGIT = as defined in IETF RFC 2327
Rtsp_URL = as defined in IETF RFC 2327

Fig3

CLASSIFIED MEDIA QUALITY OF EXPERIENCE

CROSS-REFERENCE TO RELATED APPLICATIONS

This application is a continuation of U.S. patent application Ser. No. 15/475,578 filed on Mar. 31, 2017 which was a continuation of U.S. patent application Ser. No. 13/902,807 filed on May 25, 2013, now U.S. Pat. No. 9,641,587, which was a continuation of U.S. patent application Ser. No. 10/589,060 filed on May 15, 2007, now U.S. Pat. No. 8,452,884, which was the National Stage of International Application No. PCT/IB2004/000356 filed Feb. 12, 2004. The above-identified application is herein incorporated by reference in its entirety.

FIELD OF THE INVENTION

The invention relates to a method, a computer program, a computer program product, a system, a client, a server and a protocol for reporting a streaming quality in a streaming system, wherein at least one continuous media stream is streamed to a client, and wherein said streaming is controlled by a protocol that is operated between said client and a server.

BACKGROUND OF THE INVENTION

Streaming refers to the ability of an application settled in a client to play synchronized media streams like audio and video streams in a continuous way while those streams are being transmitted to the client over a data network.

Applications that can be built on top of streaming services can be classified into on-demand and live information delivery applications. Examples of the first category are music and news-on-demand applications. Live delivery of radio and television programs are examples of the second category.

Streaming over fixed Internet Protocol (IP) networks is already a major application today. While the Internet Engineering Task Force (IETF) and the World Wide Web Consortium (W3C) have developed a set of protocols used in fixed-IP streaming services, no complete standardized streaming framework has yet been defined. For Third Generation (3G) mobile communications systems, according to the standards developed by the Third Generation Partnership Project (3GPP), the 3G Packet-switched Streaming Service (PSS, 3GPP TS 26.233) fills the gap between the 3G Multi-media Messaging Service (MMS), for instance downloading applications, and conversational services.

The PSS enables mobile streaming applications, wherein the complexity of the terminals is lower than that required for conversational services, because no media input devices and encoders are required, and because less complex protocols can be used. The PSS includes a basic set of streaming control protocols, transport protocols, media codecs and scene description protocols.

FIG. 1 schematically depicts the PSS protocol stack 1 that controls the transfer of both streamable and non-streamable content between a content or media server and a client.

Streamable content 101, such as video, audio and speech, is first converted to the payload format of the Real-time Transport Protocol (RTP) 102 in an adaptation layer 103. Said RTP as defined by the IETF provides means for sending real-time or streaming data by using the services of an underlying User Datagram Protocol (UDP) 104, which in turn uses the services of an underlying Internet Protocol (IP) 105.

Non-streamable content 106, as for instance still images, bitmap and vector graphics, text, timed text and synthetic audio are transferred by the Hypertext Transfer Protocol (HTTP) 107, which uses the services of the underlying Transport Control Protocol (TCP) 108 and the further underlying IP 105.

Whereas for the non-streamable content 106, the built-in session set-up and control capabilities of the HTTP 107 are sufficient to transfer the content, in case of streamable content 101, an advanced session set-up and control protocol has to be invoked, for instance to start, stop and pause a streaming video that is transferred from the content server to the client via the RTP/UDP/IP. This task is performed by the Real-time Streaming Protocol (RTSP) 109, which may either use the underlying TCP 108 or the underlying UDP 104. RTSP requires a presentation description 110 at least to set-up a streaming session. Such a presentation description 110 may for instance be available in the form of a Session Description Protocol (SDP) file. Said SDP file contains the description of the session, for instance session name and author, the type of media to be presented, information to receive said media, as for instance addresses, ports, formats and so on, and the bitrate of the media.

If streaming content is to be viewed at the client side, for instance at a mobile terminal, the user of said terminal is first provided with a Universal Resource Identifier (URI) to specific content that suits his terminal. This URI may come form a WWW server, a Wireless Application Protocol (WAP) server, or may have been entered manually via the keyboard of the terminal. This URI specifies a streaming or RTSP server and the address of the content on that or another content server. The corresponding SDP file may now be obtained in a number of ways. It may be provided in a link inside the HTML page that the user downloads, for instance via an embed tag, or may also be directly obtained by typing it as a URI. The SDP file, i.e. the presentation description 110, then is transferred via the HTTP 107 as indicated in the middle column of the protocol stack of FIG. 1. Alternatively, it may also be obtained through RTSP 109 signalling, for instance by using the DESCRIBE method of the RTSP 109, as indicated by the right column of the protocol stack in FIG. 1. Note that the presentation description may equally well be transmitted by said RTP 102. However, for simplicity of presentation, this possibility was not included in FIG. 1.

The subsequent session establishment is the process in which the browser or the user of the mobile terminal invokes a streaming client to set up the session against the content server. The terminal is expected to have an active radio bearer that enables IP-based packet transmission at the start of session establishment signalling.

The subsequent set-up of the streaming service is done by sending an RTSP SETUP message for each media stream chosen by the client. This returns the UDP 104 and/or TCP 108 port to be used for the respective media stream. The client sends an RTSP PLAY message to the content server that then starts to send one or more streams over the IP network.

In order to offer service providers in PSS systems means to evaluate the end user streaming experience, streaming service quality metrics have been introduced in PSS systems, as presented in 3GPP Technical document (Tdoc) S4-030860: "Draft Rel-6 PSS Quality Metrics Permanent Document v.0.10", which refers to 3GPP TSG-SA4 meeting #29 in Tampere, Finland, Nov. 24-28, 2003. The streaming client measures and feedbacks information on the quality of the actual streaming application to a streaming server, wherein said quality is defined in terms of said quality metrics. Said streaming server may for instance be an RTSP server, and said quality metrics may for instance be transported by using said RTSP and SDP.

Because the service is transparent to the type of RAN and CN, only the streaming client and the streaming server are impacted by the PSS quality metrics. One consequence of this is that the measurements may not rely on information from protocol layers below the RTP layer (e.g. UDP, IP, PDCP, RLC).

The terminal in a PSS system with quality feedback is responsible to perform the quality measurements in accordance to the measurement definition, aggregate them into streaming client quality metrics and report the metrics to the streaming server. This requirement does not preclude the possibility for the streaming client to report raw quality measurements to be processed by the streaming server into quality metrics.

The streaming server is responsible to signal the activation of the streaming client's quality metrics reporting and to gather the streaming client's quality metrics. The streaming server may process the received streaming client's quality metrics to build aggregated quality metrics. E.g. it could receive a raw lost packets report and build the Min, Max, Avg and Std packet loss rate for a particular streaming client.

The objective of the quality metric definition is to obtain consistent measurements across content type, terminals, and types of Radio Access Network (RAN).

The constraints are to minimize the size of the quality metrics report that will be sent to the streaming server and, the complexity for the terminal.

The quality metrics can be divided in 3 different types:

A first set of metrics are computed from terminal-based media quality measurements (measured within the decoder or predicted at the decoder input), e.g. the corruption duration, which is defined as the time from the start of the first corrupted media (audio/speech/video) decoded frame to the start of the first subsequent decoded good frame or the end of the reporting period (whichever is sooner), not including the buffering freezes/gaps and pause freezes/gaps.

A second set of metrics are computed by the terminal based on the general PSS protocol and the operation of the player that renders the streaming application. E.g. abnormal termination of a session.

A third set of quality metrics are computed based on terminal-measured network characteristics. E. g. number of packets lost in succession.

As already mentioned, in PSS systems RTSP is used for the feedback of quality reports according to the quality metrics. FIG. 2a lists the definition of an RTSP protocol data unit header 2a QoE-Metrics for the negotiation of the quality metrics between the streaming client and the streaming server, and FIG. 2b lists the definition of an RTSP protocol data unit header 2b QoE-Feedback for the actual feedback of quality metrics from the streaming client to the server, wherein QoE stands for "Quality of Experience".

The negotiation header 2a of FIG. 2a can be used in two ways:
1. If only the Off parameter is used, this is an indication that either the streaming server or the streaming client wants to cancel the quality metrics monitoring and reporting.
2. If the header 2a contains other parameters, then the quality metrics transmission is requested to start (or restart in case of mid-session monitoring).

If the negotiation header 2a is used with the RTSP Session Control url information, then QoE-Metrics is used at the session level. If the url is an RTSP Media Control url, then QoE-Metrics is used at the media level and each media gets its own QoE-Metrics line.

It is required to set the sending rate. If the Sending-rate value is 0, then the streaming client can send feedback messages at any time depending on events occurring in the streaming client. Values ≥1 indicate a precise message-sending interval. The shortest interval is once a second and the longest interval is undefined. The feedback sending interval can be different for different media, but it is recommended to keep a sort of synchronization, to avoid extra traffic in the uplink direction. The value End indicates that only one message is sent at the end of the session. The Range field can be used to define the time limit of feedback sending. In this way it is possible to decide the monitoring time range during the negotiation phase.

The actual quality metrics feedback can be conveyed to the PSS server by using the SET_PARAMETER method of the RTSP with the feedback header 2b of FIG. 2b.

In the feedback header 2b of FIG. 2b, Stream-url is the RTSP session or media control URL identifier for the feedback parameter. The Metrics field in the Parameters definition contains the name of the metrics/measurements (for instance corruption duration, etc.) and it shall be the same as the Metrics field in the negotiation QoE header 2a (QoE-Metrics). It is recommended to keep the order of metrics the same to simplify parsing. The Value field indicates the results. There is the possibility that the same event occurs more than once during a monitoring period. In that case the metrics value can occur more than once, which indicates the number of events to the server. The optional Timestamp indicates the time when the event (or measurement) occurred or when the metric was calculated since the beginning of the session. Also no events can be reported (using the SP—space). The optional Range indicates the reporting period.

Quality metrics reporting is normally done by the PSS client using the SET_PARAMETER method of the RTSP. However, in particular cases, it is more efficient to use other methods to carry the information, as for instance the TEARDOWN message or the PAUSE message.

Turning back to the above-stated quality metrics definition of the corruption duration as a representative of a first set of quality metrics that are computed from terminal-based media quality measurements, it is readily seen that, apart from the dependency of this quality metrics definition on the further definition of a "corruption" and a "reporting period", this quality metrics definition particularly depends on a definition of a "good frame".

A good frame is a media (audio/speech/video) decoded frame that is not corrupted, i.e. that doesn't contain any freezes/gaps or quality degradations. To declare a video or audio frame as good, in Tdoc S4-030860, the following definition is introduced: "A good frame is the earlier of N frames after last loss or a complete I-frame, where N is either (a) signalled or (b) defaults to ∞ (for video) or 1 (for audio)".

The application of this definition is not mandatory, resulting in a wide range of interpretations of the definition of a good frame. Thus different streaming clients may report different streaming qualities, because for the same quality metric (for instance corruption duration), different definitions for a "good frame" are applied. A similar ambiguity arises when different terminals use different error tracking algorithms, so that even when using the same definition of a "good frame", the reported streaming quality in terms of the same quality metric may differ across the terminals. These ambiguities cause the reported quality metrics to be imprecise and effectively worthless.

SUMMARY OF THE INVENTION

In view of the above-stated problems, it is, inter alia, an object of the present invention to provide a method, a computer program, a computer program product, a system, a client, a server and a protocol allowing for an improved, in particular a more significant reporting of a streaming quality.

A method is provided for reporting a streaming quality, wherein at least one continuous media stream is streamed to a client, and wherein said streaming is controlled by a protocol that is operated between said client and a server, comprising selecting at least one quality metric and a quality metrics class from a pre-defined set of at least two quality metrics classes, and reporting to said server the quality of said streaming based on said at least one selected quality metric and said selected quality metrics class.

Said at least one continuous media stream may for instance contain video, audio or speech information that is continuously transmitted from a server, for instance a content server, to said client and is rendered on the terminal, in which said client is set up, in a synchronised manner. This streaming may take place in a streaming session, wherein several media streams may be concurrently streamed to said client. Said streaming is controlled by said protocol, for instance a streaming protocol as the RTSP, and may for instance allow to start, stop and/or pause the streaming. Said RTSP is operated by protocol entities in said client and in said server and may be based on an SDP. Said server may be co-located or even be identical with the content server from which said continuous media actually stems from, or may be a different instance. The quality of said streaming is determined at the client site according to said at least one quality metric, as for instance a corruption duration or a re-buffering event. Said quality metrics class at least partially defines how said at least one quality metric has to be determined. For instance, if said at least one quality metric depends on the decision whether a frame of said continuous media stream is a good frame, said quality metrics class may define how this decision has to be come to. Said set of at least two quality metrics classes is pre-defined. In said step of selecting, at least said client or said server choose at least one quality metric, for instance from a pre-defined set of quality metrics, and at least said client or said server choose a quality metrics class from said pre-defined set of at least two quality metrics classes defined. Said pre-defined sets may for instance be defined within an RTSP and/or an SDP. Said step of selecting may further comprise the negotiation between said client and server on at least one of said quality metrics and a quality metrics class. Said negotiation may be done between said client and server through said protocol, for instance RTSP and SDP. Based on said at least one selected quality metric and said at said quality metrics class, said client then reports said quality of said streaming to said server.

Thus according to a first aspect of the present invention, the incorporation of additional quality metrics classes restricts the interpretation of the quality metrics definitions and thus contributes to make the quality reports more significant and concise. According to a second aspect of the present invention, the incorporation of said additional quality metrics classes adds an additional degree of freedom in the definition of quality metrics. For instance, if a corruption duration, which, inter alia, depends on the decision whether frames of said continuous media stream are good frames or corrupted frames, is selected as quality metric, this quality metric can be further specialized by the selection of the quality metrics class, which may for instance provide a variety of definitions of a good frame. Thus, without loosening conciseness of the quality metric itself, because each definition of a good frame according to the quality metrics class is fixedly prescribed, the scope of application of the quality metric is extended.

According to the method of the present invention, it may be preferred that said step of selecting said quality metrics class comprises the step of negotiating said quality metrics class between said client and said server. Said negotiation may be based on said protocol that also controls said streaming, for instance RTSP in combination with SDP, and may further comprise the negotiation of said at least one quality metric.

According to the method of the present invention, it may be preferred that said protocol defines a quality metrics class field within at least one of its protocol data units, wherein said quality metrics class field is capable of identifying each quality metrics class of said pre-defined set of at least two quality metrics classes. Each quality metrics class may for instance be assigned a unique number, and said quality metrics class field then contains the number of the quality metrics class that has been selected. Similarly, said protocol data units may further contain a field for the identification of said at least one selected quality metric and a field for carrying a feedback value that has been determined according to said at least one quality metric and said quality metrics class. Said protocol data unit may either be a protocol data unit for negotiation or a protocol data unit for feedback. Signalling said selected quality metrics class during negotiation may be sufficient, so that no fields in feedback protocol data units may be required. Said field may be an optional field or mandatory field in said protocol data units.

According to the method of the present invention, it may be preferred that said quality metrics class field is located in a header section of said at least one protocol data unit. Alternatively, it may also be comprised in the payload section of said at least one protocol data unit.

According to the method of the present invention, it may be preferred that said at least one selected quality metric is a Quality of Experience (QoE) metric that is at least partially based on the decision whether at least one frame of said at least one continuous media stream is a good frame. Said quality metric may for instance be a corruption duration, wherein said corruption duration may be defined as the time between a corrupted frame and the next good frame.

According to the method of the present invention, it may be preferred that each quality metrics class in said pre-defined set of at least two quality metrics classes defines a different set of rules on how to decide whether a frame of said continuous media stream is a good frame. Said quality metrics classes may for instance be based on an error tracking algorithm or on a decoding quality evaluation algorithm.

According to the method of the present invention, it may be preferred that said set of rules defined by at least one of said quality metrics classes comprises deciding the earlier of a completely received I-frame of said at least one continuous media stream or the N-th completely received frame of said at least one continuous media stream after the last error or loss to be a good frame, wherein the integer N is either signalled or defaults to ∞ in case of a video frame or 1 in case of an audio frame, and deciding a frame of said at least one continuous media stream following a good frame to be a good frame, if said frame is completely received, and said frame and all subsequent frames until the next good frame to be corrupted, otherwise. Said I-frame may for instance be a frame within a coded video stream wherein said frame contains the complete pixel information. In case of the H.264 or MPEG-4 Advanced Video Coding (AVC) codecs, said I-frame represents an IDR-frame. If said client can derive the actually required value of N from extra information, e.g. information obtained from the AVC recovery point Supplemental Enhancement Information (SEI) message for AVC video, that value may override the signalled or default value of N. Said frame may be understood to be completely received if all bits encoding said frame are correctly received and no bit error occurred.

According to the method of the present invention, it may be preferred that said set of rules defined by at least one of said quality metrics classes comprises deciding a coded frame of said at least one continuous media stream as a good frame based on an error tracking algorithm.

According to the method of the present invention, it may be preferred that said set of rules defined by at least one of said quality metrics classes comprises deciding an intra-coded frame of said at least one continuous media stream to be a good frame, if it is completely received at said client, and to be a corrupted frame otherwise, or deciding a predictively coded frame of said at least one continuous media stream to be a good frame, if it is completely received at said client and if all its prediction reference samples belong to good frames, and to be a corrupted frame otherwise. Said intra-coded frames, for video, may be understood as frames without temporal motion-compensated prediction, but possibly with removal of spatial redundancy within the frame, and said predictively coded frames, for video, may be understood as frames with temporal motion-compensated prediction to reduce the temporal redundancy by taking advantage of the strong correlation among the video frames. Said prediction reference samples may for instance be prediction reference pixels in case of video.

According to the method of the present invention, it may be preferred that said set of rules defined by at least one of said quality metrics classes comprises deciding a coded frame of said at least one continuous media as a good frame according to a decoding quality evaluation algorithm.

According to the method of the present invention, it may be preferred that said set of rules defined by at least one of said quality metrics classes comprises deciding an intra-coded frame of said at least one continuous media stream to be a good frame, if it is completely received at said client, and to be a corrupted frame otherwise, or deciding a predictively coded frame of said at least one continuous media stream to be a good frame, if it is completely received at said client and all of its prediction reference samples belong to good frames, or if at least a part of said frame is completely received, all prediction reference samples, for instance reference pixels for video, of said completely received parts of said frame belong to good frames, and all concealed parts of said frame are considered as good, wherein concealed parts of said frame are obtained by applying an error concealment algorithm to lost or erroneous parts of a decoded version of said frame, and wherein said concealed parts are considered as good if an average boundary difference between said concealed parts and surrounding completely received and decoded parts of said frame is below a threshold. Said concealment may for instance comprise estimation of reconstruction of lost or erroneous pixels based on spatial and/or temporal neighbors of said pixels. Said average boundary difference may quantify a sum of luminance differences between pixels at the edges of concealed parts. Said threshold may for instance be equal to 3.

According to the method of the present invention, it may be preferred that said protocol is a Real-time Streaming Protocol RTSP in combination with a Session Description Protocol SDP in the context of a Packet-Switched Streaming Service PSS of a third generation mobile communications system. Said SDP may for instance provide the presentation description that is required by the RTSP in order to control said streaming.

According to the method of the present invention, it may be preferred that said SDP comprises at least one SDP attribute that defines at least one quality metrics class field, wherein said quality metrics class field is capable of identifying each quality metrics class of said pre-defined set of at least two quality metrics classes.

Each quality metrics class may for instance be assigned a unique number, and said quality metrics class field then contains the number of the quality metrics class that has been selected. Similarly, said SDP attribute may further contain a field for the identification of said at least one selected quality metric.

According to the method of the present invention, it may be preferred that said RTSP is used to negotiate a quality metrics class between said client and said server at least partially based on said SDP attribute. SDP may for instance be used to initiate the negotiation of quality metrics and quality metrics classes. It is then advantageous to add said field to the SDP attribute that is used for the negotiation initiation.

According to the method of the present invention, it may be preferred that said RTSP uses a DESCRIBE method for said negotiation. Said negotiation may for instance be initiated by using said RTSP DESCRIBE method in conjunction with said SDP attribute.

A computer program is provided according to the invention with instructions operable to cause a processor to perform the above-mentioned method steps. Said computer program may for instance be run on a processor that is integrated in either said client or said server.

Further, a computer program product comprising a computer program with instructions operable to cause a processor to perform the above-mentioned method steps.

A streaming system is provided according to the invention comprising at least one client, and at least one server, wherein at least one continuous media stream is streamed to said at least one client, and wherein said streaming is controlled by a protocol that is operated between said at least one client and said at least one server, wherein at least one quality metric and a quality metrics class from a pre-defined set of at least two quality metrics classes are selected, and wherein the quality of said streaming based on said at least one selected quality metric and said selected quality metrics class is reported to said at least one server.

In further accord with the present invention, a client is provided for a streaming system, comprising a device or means for operating a protocol that controls a streaming of at least one continuous media stream to said client, a selector or means for selecting at least one quality metric and a quality metrics class from a pre-defined set of at least two quality metrics classes, and a reporting device or means for reporting the quality of said streaming based on said at least one selected quality metric and said selected quality metrics class to a server.

In still further accord with the present invention, a server is provided for a streaming system, comprising a device or means for operating a protocol that controls a streaming of at least one continuous media stream to a client, a selector or means for selecting at least one quality metric and a quality metrics class from a pre-defined set of at least two quality metrics classes, and a receiver or means for receiving a reported quality of said streaming from said client, wherein said quality is reported based on said at least one selected quality metric and said selected quality metrics class.

According still further to the present invention, a streaming system is provided, comprising rules for the control of a streaming of at least one continuous media stream to a client, a definition of at least one quality metric and of a set of at least two quality metrics classes, rules for the selection of at least one quality metric and of a quality metrics class from said set of at least two quality metrics classes, and rules for the report of a quality of said streaming based on said at least one selected quality metric and said selected quality metrics class to a server. Said protocol may for instance be the RTSP in combination with the SDP in the context of a 3G PSS system.

These and other aspects of the invention will be apparent from and elucidated with reference to the embodiments described hereinafter.

BRIEF DESCRIPTION OF THE FIGURES

FIG. 2*a*: a definition of a Real-time Streaming Protocol (RTSP) negotiation header according to the prior art, FIG. 2*b*: a definition of an RTSP feedback header according to the prior art, FIG. 3: a definition of a modified RTSP negotiation header according to the present invention.

DETAILED DESCRIPTION OF THE INVENTION

Figure 1:
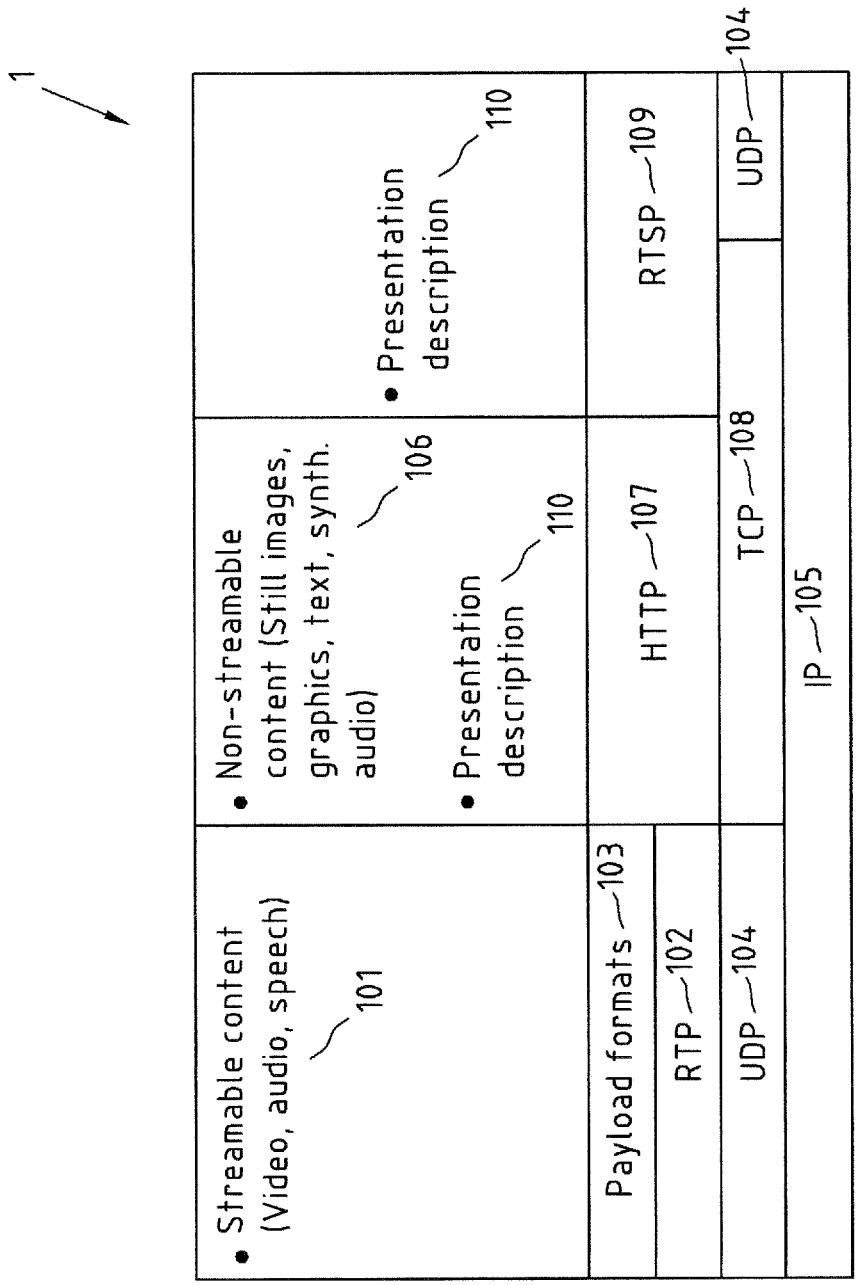
FIG. 1: A schematic representation of a Packet-Switched Streaming Service (PSS) protocol stack according to the prior art.

For the present invention, the protocol stack of FIG. 1 and the feedback RTSP header as defined in FIG. 2*b* still apply. However, a modified negotiation RTSP header 3 is defined, as listed in FIG. 3. The principle of the modification and the end result may be extended to other protocols.

The modified negotiation RTSP header 3 of FIG. 3 provides an additional RTSP field Metrics-class, which may either have the values "0", "1" or "2", for example.

During negotiation between the streaming client and the streaming server, thus not only the quality metric that is to be used in the subsequent quality feedback of the streaming client is agreed upon by utilizing the Metrics RTSP field of the modified negotiation RTSP header 3 of FIG. 3, but also the quality metrics class is negotiated by utilizing the Metrics-class RTSP field.

If SDP is used to initiate QoE metrics negotiation, the Metrics-class field may also be added to the SDP attribute that is used for QoE negotiation initiation.

The present invention proposes, e.g., three different methods to judge whether frames of the continuous media stream that is streamed to the streaming client are good frames (otherwise they are considered as corrupted frames). Each of said respective methods is uniquely identified by one of the values "0", "1" and "2" that the Metrics-class RTSP field can be assigned. Assuming that the quality metric is at least partially based on the decision whether frames are good or corrupted frames, for instance if the quality metric is a corruption duration, the overall information content of the quality metric obeying the judging method according to the selected quality metrics class is much more concise and significant. Furthermore, a specialization of the quality metric is achieved, because each quality metric at least partially based on a good frame decision is now divided into three quality metrics, each with a different good frame judging method.

In the description that follows, the three exemplary judging methods as proposed by the present invention will be discussed.

First Judging Method

The first method is similar as the one disclosed in Tdoc S4-030860, with some enhancing modifications. It is described as follows:

A good frame is the earlier of 1) a completely received I-frame (for H.264 or MPEG-4 Advanced Video Coding (AVC) video, IDR-frame), or 2) the N-th completely received frame after the last error or loss, where N is either signalled or defaults to ∞ (for video) or 1 (for audio). If the client can derive the actually required value of N from extra information, e.g. information obtained from the AVC recovery point Supplemental Enhancement Information (SEI) message for AVC video, that value overrides the above-specified value. "Completely received" means that all the bits are received and no bit error occurred.

If a frame following a good frame is completely received, it is a good frame. Otherwise, all subsequent frames from the frame in question (inclusive) to the next good frame (exclusive) are corrupted frames.

Second Judging Method

The second method is characterized by applying an error tracking algorithm. One possible embodiment of the second method is described as follows:

For an intra-coded frame, if it is completely received, it is a good frame. Otherwise it is a corrupted frame.

For a predictively coded frame, if it is completely received and all its prediction reference samples are belonging to good frames, it is a good frame. Otherwise it is a corrupted frame.

Third Judging Method

The third method is characterized by applying a certain decoding quality evaluation algorithm. A possible embodiment of the third judging method will be described subsequently.

The instance of the third method is at least partially based on the concealment of lost or erroneous parts of a predictively coded frame. Thus a parenthesis on the applied error concealment strategy of predictively coded frame has to precede the presentation of the instance of the third method.

It is assumed that erroneous or incomplete parts of a frame are not decoded but discarded before decoding, therefore no integrity checking or bit-error detection is performed. All correctly received parts of a picture are decoded first, and then the lost parts are concealed. In practice, a record is kept in a macroblock (MB) based status map of the frame. The status of an MB in the status map is "Correctly received" whenever the part where the MB resides is available for decoding, and "Lost" otherwise. After the frame is decoded, if the status map contains "Lost" MBs, concealment is initiated.

Given the structure of correctly received and lost parts of a frame and the MB-based status map of a frame, the applied concealment algorithm is MB-based. The missing frame area (pixels) covered by MBs marked as "Lost" in the status map are concealed MB-by-MB (16×16 Y pixels, 8×8 U, V pixels), wherein Y refers to luminance and U and V refer to chrominance pixels. After an MB has been concealed, it is marked in the status map as "Concealed". Not only the "Correctly received" but also the "Concealed" MBs are treated as reliable neighbors in the concealment process whenever no "Correctly received" immediate neighbor of a "Lost" MB exists. In such cases, an unsuccessfully concealed MB can result in propagation of this concealment mistake to several neighboring concealed MBs. Therefore, the order in which "Lost" MBs are concealed is important. The processing starts with MB columns at the frame boundaries and then moves inwards column-by-column. This processing order helps to prevent a typical concealment mistake that is made in the usually "difficult" (discontinuous motion areas, large coded prediction error) center part of the frame from propagating to the "easy" (continuous motion area, similar motion over several frames) parts of the frame.

Figure 4:
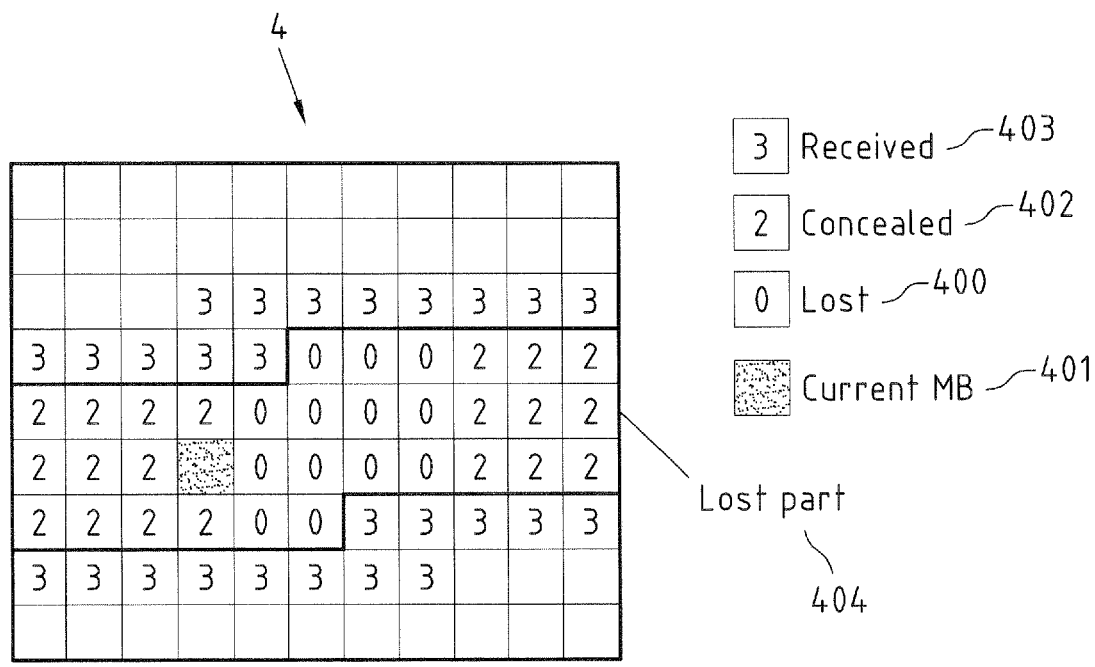
FIG. 4: an exemplary Macro Block (MB) status map for an error concealment algorithm according to the present invention.

FIG. 4 shows a snapshot of the status map during the concealment phase where already concealed MBs 402 have the status of "Concealed", correctly received MBs 403 have the status of "Received", lost MBs 400 have the status "Lost" and the currently processed (being concealed) MB 401 is marked as "Current MB". FIG. 4 further indicates a lost part 404, that can only consist of concealed 402 or lost 400 MBs.

Only "Correctly received" neighboring MBs 403 are used for concealment if at least two such MBs are available. Otherwise, neighboring "Concealed" MBs 402 are also used in the averaging operation.

Instead of directly operating in the pixel domain a more efficient approach is to try to "guess" the motion in the missing pixel area (MB) 400 by some prediction schemes from available motion information of spatial or temporal neighbors. This "guessed" Motion Vector (MV) is then used for motion compensation using the reference frame.

The copied pixel values give the final reconstructed pixel values for concealment, and no additional pixel domain operations are used.

The motion activity of the correctly received parts (groups of correctly received MBs 403) of the current picture is investigated first. If the average MV is smaller than a pre-defined threshold (currently ¼ pixels for each MV component), all lost parts 404 are concealed by copying from the spatially corresponding positions in the reference frame.

Otherwise, motion-compensated error concealment is used, and the MVs of the lost MBs 400 are predicted as described in the following paragraphs.

The motion of a "Lost" MB 400 is predicted from a spatial neighbor MB's motion relying on the statistical observation, that motion of spatially neighboring frame areas is highly correlated. For example, in a frame area covered by a moving foreground scene object, the MV field is continuous, which means that it is easy to predict.

The MV of a "Lost" MB 400 is predicted from one of the neighbor MBs (or 8×8 blocks). This approach assumes that the MV of one of the neighbor MBs (or blocks) models the motion in the current MB well. It was found in previous experiments, that median or averaging over all neighbors' MVs did not give better results. For simplicity, in the current implementation the smallest neighbor block size that is considered separately as prediction is set to 8×8 Y pixels. The motion of any 8×8 block is calculated as the average of the motion of the spatially corresponding 4×4 or other shaped (e.g. 4×8) blocks.

Figure 5:
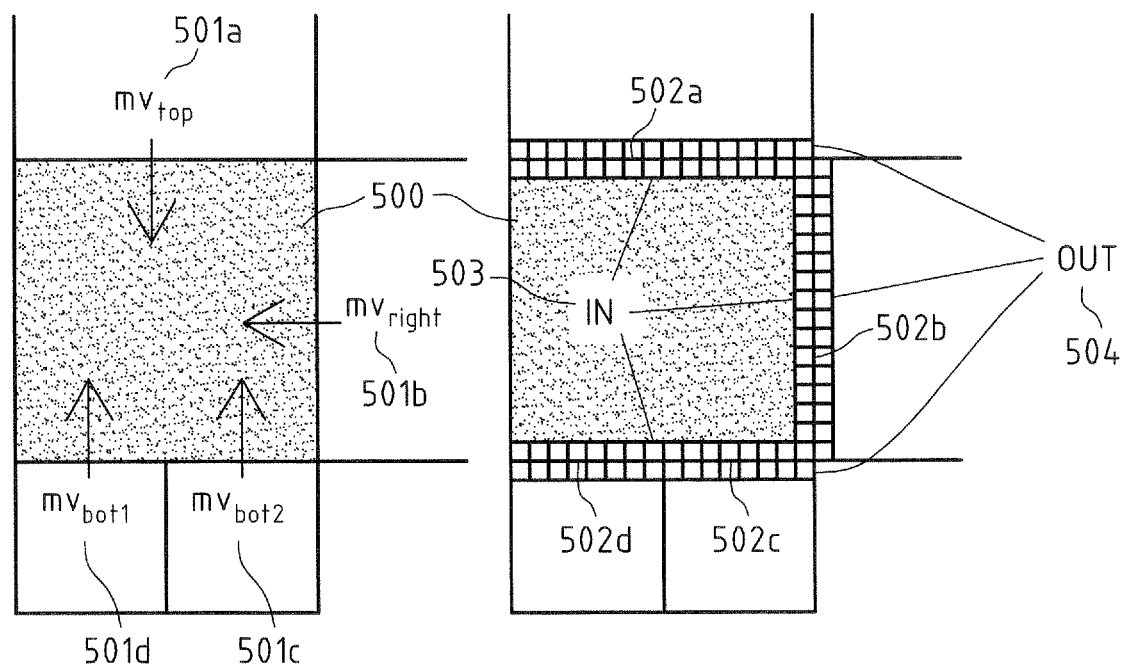
FIG. 5: an illustration of a method for the calculation of an average boundary difference according to the present invention.

The decision of which neighbor's MV to use as prediction for the current MB 500 is made based on the smoothness of the concealed (reconstructed) and will be explained with reference to FIG. 5. During this trial procedure the concealment pixel values of MB 500 are calculated using the MV 501a-d of each candidate (motion compensated pixel values). The MV 501a-d that results in the smallest luminance change across block boundaries 502a-d when the block 500 is inserted into its place in the frame is selected. The zero MV case is always considered and this copy concealment (copy pixel values from the spatially corresponding MB in the reference frame) is evaluated similarly as other MV candidates.

The winning prediction MV is the one which minimizes the side match distortion $d_{sm}$, which is the sum of absolute Y pixel value differences of the IN-block 503 and neighboring OUT-block 504 pixels at the boundaries 502a-d of the current block 500, as shown in eq. (1):

$$\operatorname*{minarg}_{dir\in\{top,bot,left,right\}} \left\{ d_{sm} = \frac{1}{N}\sum_{j=1}^{N} \left| \hat{Y}_j^{IN}(mv_{dir}) - Y_j^{OUT} \right| \right\} \quad (1)$$

where $\hat{Y}_j^{IN}(mv_{dir})$ is the j-th concealed Y value in the IN-blocks 503 using $mv_{dir}$ to predict the MV, and $Y_j^{OUT}$ is the j-th reconstructed Y value in the OUT-blocks 504, and N is the total number of the calculated boundary pixels.

When "Correctly received" neighbor MBs 403 exist, the side match distortion is calculated only over them.

Otherwise, "Concealed" neighbor MBs 402 are included in the calculation.

A possible embodiment of the third method now can be described as follows:

For an intra-coded frame, if it is completely received, it is a good frame. Otherwise it is a corrupted frame.

For a predictively coded frame:
a) If it is completely/correctly received and all its prediction reference samples are belonging to good frames, it is a good frame.
b) If at least part of the frame is completely/correctly received, and the prediction reference samples of completely/correctly received parts are belonging to good frames, the frame is judged using step c. Otherwise the frame is corrupted.
c) The frame is decoded and the lost or erroneous parts being concealed using the above-described error concealment algorithm. If the average boundary difference, i.e. the side match distortion of eq. (1), between a concealed part and the surrounded completely/correctly received and decoded part is smaller than a threshold, the concealed part is considered as good. If all the concealed parts are good, the frame is a good frame. Otherwise, the frame is corrupted.

The threshold in this method may for instance be chosen equal to 3.

Figure 6:
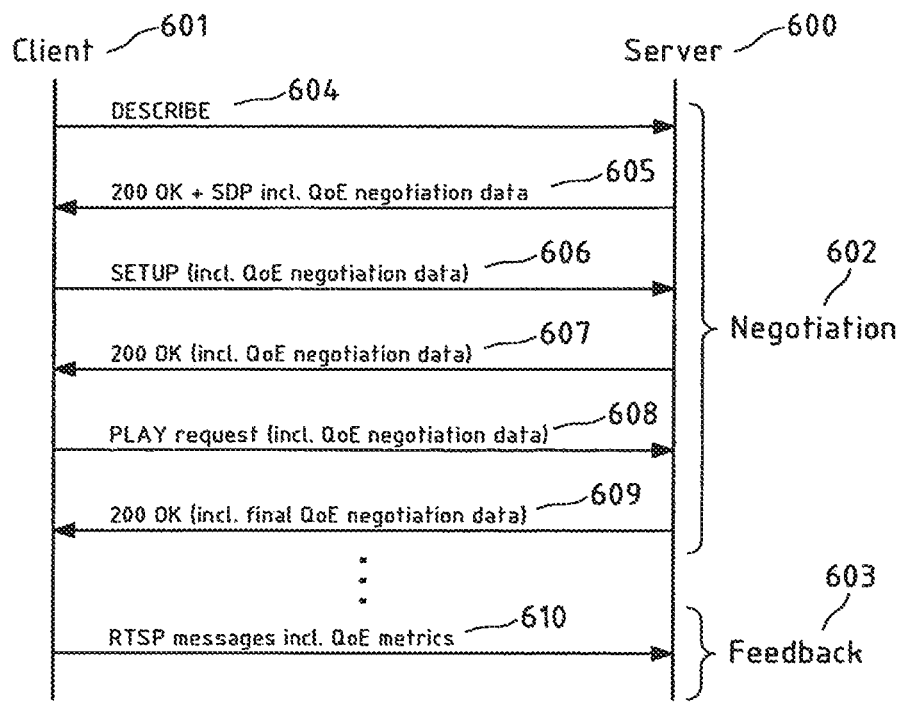
FIG. 6: a flowchart of the method of the present invention.

FIG. 6 depicts a flowchart of the method for reporting a streaming quality according to the present invention. The method steps are represented by requests and acknowledgements that are exchanged between a streaming server 600 and a streaming client 601, wherein said requests and acknowledgements obey the RTSP. Furthermore, it is readily seen that the method steps can be classified into a negotiation step 602 and a feedback step 603.

The Quality Metrics negotiation starts with a response 605 of the streaming server 600 to a DESCRIBE request 604 of the streaming client 601. Into said response 605, at least one quality metrics and a quality metrics class as desired by the streaming server 600 for the future quality reporting is embedded by means of Session Description Protocol (SDP) data. If the streaming client 601 supports quality metrics, then it shall send a SETUP request 606 containing the selected/modified quality metrics and quality metrics class for either session level, or the media level, which is being set-up.

In order for the streaming client 601 to indicate that both session level and media level quality metrics are supported, the client may send all the supported/modified quality metrics related to the media level. It may also send the selected session level quality metrics in at least one of the SETUP requests. In the above SETUP request 606, the client only modifies the sending rate of the quality metrics for the control URL as compared to the initial SDP description contained in the response 605 of the server 600.

Receiving this SETUP request 606, the streaming server 600 returns back the 200/OK response 607 containing the accepted quality metrics and quality metrics class returned by the streaming client 601 (to re-acknowledge the changes). It may also reject the changes made by the streaming client 601. If the streaming server 600 rejects the changes, it can either set new values and resend the modified quality metrics and quality metrics class back to the streaming client 601, or it can simply ignore the quality metrics and quality metrics class and not re-acknowledge them.

If the streaming server 600 does not approve the modifications done by the streaming client 601, they can continue to re-negotiate until the RTSP PLAY request 608 and the RTSP PLAY response 609 of the streaming server 600 would return the final negotiated quality metrics and quality metrics class including all session and media level metrics values.

The actual feedback according to the negotiated quality metric and quality metrics class then is performed in at least one step 610, for instance based on the RTSP feedback header 2*b* as defined in FIG. 2*b*.

It should be noted that each time the QoE-Metrics header field is sent in an RTSP request, it shall also be present in the response corresponding to that particular request. Otherwise, the receiver of the response assumes that the other end does NOT support Quality Metrics. The same may apply for the QoE-Metrics-Class header field.

Figure 7:
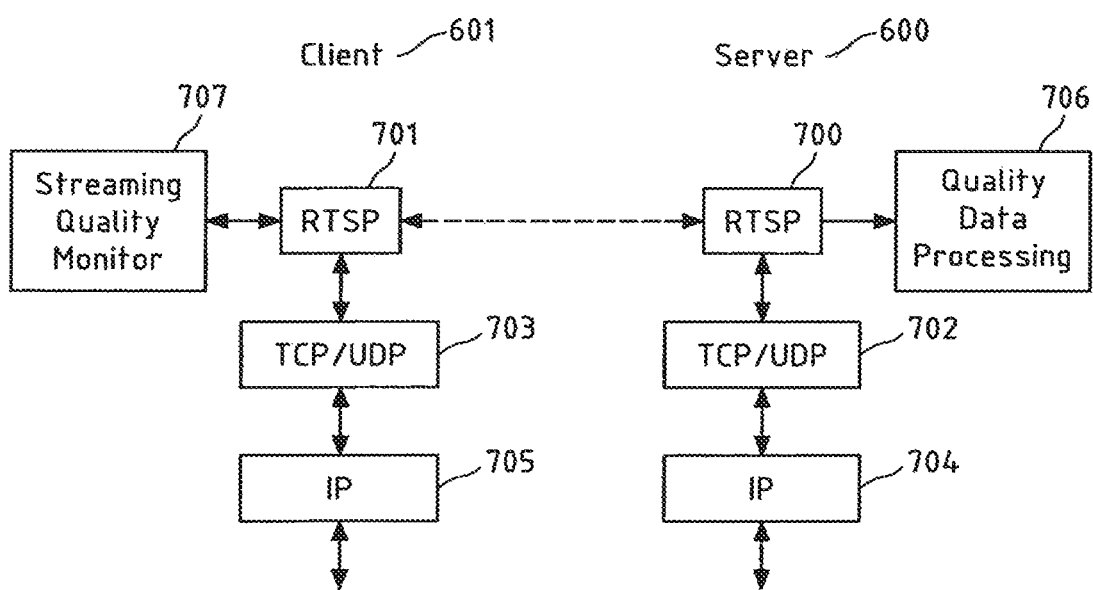
FIG. 7: a schematic representation of a system according to the present invention.

FIG. 7 schematically depicts the functional components of a system according to the present invention. The PSS system comprises a streaming client 601 and a streaming server 600, wherein both client 601 and server 600 have at least one RTSP entity 701, 700 that is capable of operating the RTSP. The RTSP entities 700, 701 use the services of underlying protocol layers that are operated by further protocol entities, of which only the TCP/UDP entities 702, 703 and the IP entities 704, 705 are shown. The streaming client 601 is further connected to a streaming quality monitor instance 707, which monitors the quality of the actual streaming application in terms of the negotiated quality metrics and quality metrics class and inputs monitored quality values into said RTSP entity 701. Said streaming quality monitor may for instance be provided by the terminal, in which said streaming client is set up. Via the RTSP, said monitored quality values are transferred to the RTSP peer entity in the streaming server 600, where they are input into a quality data processing instance 706 for evaluation and analysis, which may for instance aim at improving the quality of the streaming application by enhancing the data rate of the streaming application if it is found that the re-buffering events become too frequent.

The invention has been described above by means of a preferred embodiment. It should be noted that there are alternative ways and variations which will be evident to any person of skill in the art and can be implemented without deviating from the scope and spirit of the appended claims. In particular, the quality metrics classes may be used to render the definition of any quality metric that is at least partially based on good frame decision more precisely and at the same time allow a specialization of said quality metric. For instance, quality metrics classes may provide different definitions of what is to be understood under a corruption itself, or may provide definitions for different degrees of frame corruptions, which then, in combination with a quality metric that at least partially depends on a definition of a corruption, allow for a much more concise reporting of streaming quality. The scope of the present invention is by no means restricted to application in third generation mobile communication system. Also application in different wireless and even wired streaming systems may be imagined.

The invention claimed is:

1. A method of operating a server to improve a quality of streaming media transmitted by the server, comprising:
receiving, from a client device, a protocol message requesting streaming media;
negotiating, with the client device, at least one quality of experience metric for measuring a quality of streaming of streaming media, the at least one negotiated quality of experience metric comprising re-buffering events;
transmitting at least one media stream to the client device;
receiving at least one feedback message from the client device reporting the quality of streaming of at least one media stream transmitted by the server and received by the client device, based on, at least in part, on the negotiated quality of experience metric; and
responsive to receiving at least one feedback message reporting re-buffering events occurring above a desired frequency, increasing a data rate of the transmitting of the at least one media stream;
wherein the negotiating step comprises:
receiving, from the client device, a message comprising:
a quality metrics class parameter indicating a quality metrics class to be used in determining a quality of streaming of at least one media stream transmitted by the server and received by the client device, the quality metrics class being selected from a pre-defined set of at least two quality metrics classes, each defining a different set of rules for judging whether a frame of a media stream is a good frame, wherein the quality metrics class parameter is capable of identifying each quality metrics class of the pre-defined set of at least two quality metrics classes; and
at least one quality of experience metric that is at least partially based on judging whether at least one or more frame of at least one media stream received by the client device is a good frame according to rules corresponding to the indicated quality metrics class;

and wherein the feedback message further reports the quality of streaming of the at least one media stream transmitted by the server and received by the client device based on, at least in part, the quality of experience metric.

2. The method of claim 1, wherein the at least one quality of experience metric that is at least partially based on judging whether at least one or more frame of at least one media stream received by the client device is a good frame according to rules corresponding to the indicated quality metrics class comprises corruption duration.

3. The method of claim 1, wherein the set of rules defined by at least one of the quality metrics classes comprises:
judging, to be a good frame, the earlier of:
a completely received i-frame of the at least one media stream; or
the N-th completely received frame of the at least one media stream after last frame error or loss, wherein the integer N is either signaled or defaults to ∞ in case of a video frame or to 1 in case of an audio frame; and
judging a frame of the at least one media stream following a good frame to be a good frame, if the frame is completely received, and otherwise judging the frame and all subsequent frames until the next good frame to be corrupted.

4. The method of claim 1, wherein the set of rules defined by at least one of the quality metric classes comprises judging a coded frame of the at least one media stream to be a good frame according to an error tracking algorithm.

5. The method of claim 4, wherein the set of rules defined by at least one of the quality metrics classes comprises: judging an intra-coded frame of the at least one media stream to be a good frame, if it is completely received, and to be a corrupted frame otherwise; or 5ing a predictively coded frame of the at least one media stream to be a good frame, if it is completely received and if all its prediction reference samples belong to good frames, and to be a corrupted frame otherwise.

6. The method of claim 1, wherein the set of rules defined by at least one of the quality metrics classes judging deciding a coded frame of the at least one media stream to be a good frame according to a decoding quality evaluation algorithm.

7. The method of claim 6, wherein the set of rules defined by at least one of the quality metrics classes comprises:
judging an intra-coded frame of the at least one media stream to be a good frame, if it is completely received, and to be a corrupted frame otherwise; or
judging a predictively coded frame of the at least one media stream to be a good frame, if it is completely received and all of its prediction reference samples belong to good frames, or if at least a part of the frame is completely received, all prediction reference samples of the completely received parts of the frame belong to good frames, and all concealed parts' of the frame are considered as good;
wherein:
concealed parts of the frame are obtained by applying an error concealment algorithm to lost or erroneous parts of a decoded version of the frame; and
the concealed parts are considered as good if an average boundary difference between the concealed parts and surrounding completely received and decoded parts of the frame is below a threshold.

8. A server, comprising:
a device for operating a protocol that controls a streaming of at least one media stream to a client device;
a receiver for receiving a reported quality of streaming from the client device; and one or more processors operable to cause the server to:
receive, from a client device, a protocol message requesting streaming media;
negotiate, with the client device, at least one quality of experience metric for measuring a quality of streaming of streaming media, the at least one negotiated quality of experience metric comprising re-buffering events;
wherein the one or more processors is configured to negotiate at least one quality of experience metric with the client device by a plurality of operations comprising:
receiving, from the client device, a message comprising:
a quality metrics class parameter indicating a quality metrics class to be used in determining a quality of streaming of at least one media stream transmitted by the server and received by the client device, the quality metrics class being selected from a pre-defined set of at least two quality metrics classes, each defining a different set of rules for judging whether a frame of a media stream is a good frame, wherein the quality metrics class parameter is cap able of identifying each quality metrics class of the pre-defined set of at least two quality metrics classes; and
at least one quality of experience metric that is at least partially based on judging whether at least one or more frame of at least one media stream received by the client device is a good frame according to rules corresponding to the indicated quality metrics class;
and wherein the feedback message further reports the quality of streaming of the at least one media stream transmitted by the server and received by the client device based on, at least in part, the quality of experience metric;
transmit at least one media stream to the client device;
receive at least one feedback message From the client device reporting the quality of streaming of at least one media stream transmitted by the server and received by the client device, based on, at least in part, on the negotiated quality of experience metric; and
responsive to receiving at least one feedback message reporting re-buffering events occurring above a desired frequency, increase a data rate of the transmitting of the at least one media stream.

9. The server of claim 8, wherein the at least one quality of experience metric that is at least partially based on judging whether at least one or more frame of at least one media stream received by the client device is a good frame according to rules corresponding to the indicated quality metrics class comprises corruption duration.

10. The server of claim 8, wherein the set of rules defined by at least one of the quality metrics classes comprises:
judging, to be a good frame, the earlier of:
a completely received I-frame of the at least one media stream; or
the N-th completely received frame of the at least one media stream after last frame error or loss, wherein the integer N is either signaled or defaults to ∞ in case of a video frame or to 1 in case of an audio frame; and judging a frame of the at least one media stream following a good frame to be a good frame, if the frame is completely received, and otherwise judging the frame and all subsequent frames until the next good frame to be corrupted.

11. The server of claim 8, wherein the set of rules defined by at least one of the quality metric classes comprises judging a coded frame of the at least one media stream to be a good frame according to an error tracking algorithm.

12. The server of claim 11, wherein the set of rules defined by at least one of the quality metrics classes comprises:
   judging an intra-coded frame of the at least one media stream to be a good frame, if it is completely received, and to be a corrupted frame otherwise; or
   judging a predictively coded frame of the at least one media stream to be a good frame, if it is completely received and if all its prediction reference samples belong to good frames, and to be a corrupted frame otherwise.

13. The server of claim 8, wherein the set of rules defined by at least one of the quality metrics classes judging deciding a coded frame of the at least one media stream to be a good frame according to a decoding quality evaluation algorithm.

14. The server of claim 13, wherein the set of rules defined by at least one of the quality metrics classes comprises:
   judging an intra-coded frame of the at least one media stream to be a good frame, if it is completely received, and to be a corrupted frame otherwise; or
   judging a predictively coded frame of the at least one media stream to be a good frame, if it is completely received and all of its prediction reference samples belong to good frames, or if at least a part of the frame is completely received, all prediction reference samples of the completely received parts of the frame belong to good frames, and all concealed parts' of the frame are considered as good;
   wherein:
      concealed parts of the frame are obtained by applying an error concealment algorithm to lost or erroneous parts of a decoded version of the frame; and
      the concealed parts are considered as good if an average boundary difference between the concealed parts and surrounding completely received and decoded parts of the frame is below a threshold.

* * * * *